(12) United States Patent
Kang et al.

(10) Patent No.: US 10,141,138 B2
(45) Date of Patent: Nov. 27, 2018

(54) SWITCH ASSEMBLY

(71) Applicant: FORD GLOBAL TECHNOLOGIES, LLC, Dearborn, MI (US)

(72) Inventors: Baogang Kang, Nanjing (CN); Chong Deng, Nanjing (CN); Wei Xu, NanJing (CN); Bing Chen, Nanjing (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 49 days.

(21) Appl. No.: 15/344,767

(22) Filed: Nov. 7, 2016

(65) Prior Publication Data

US 2017/0133179 A1    May 11, 2017

(30) Foreign Application Priority Data

Nov. 6, 2015 (CN) .......................... 2015 1 0751953

(51) Int. Cl.
| | |
|---|---|
| *H01H 23/14* | (2006.01) |
| *H01H 1/44* | (2006.01) |
| *H01H 23/12* | (2006.01) |
| *H01H 23/28* | (2006.01) |
| *B60R 11/00* | (2006.01) |
| *H01H 3/50* | (2006.01) |

(52) U.S. Cl.
CPC .......... *H01H 23/148* (2013.01); *B60R 11/00* (2013.01); *H01H 1/44* (2013.01); *H01H 23/12* (2013.01); *H01H 23/28* (2013.01); *B60R 2011/0028* (2013.01); *B60R 2011/0043* (2013.01); *H01H 3/50* (2013.01); *H01H 2231/026* (2013.01)

(58) Field of Classification Search
CPC .. H01H 23/148; H01H 2231/026; H01H 1/44; H01H 23/12; H01H 23/28

USPC .......................................................... 200/5 R
See application file for complete search history.

(56) References Cited

U.S. PATENT DOCUMENTS

| | | | | |
|---|---|---|---|---|
| 3,053,337 | A | | 9/1962 | Prohaska et al. |
| 5,803,243 | A | | 9/1998 | Nestor et al. |
| 5,824,977 | A | * | 10/1998 | Takano ................... H01H 15/06 200/16 C |
| 5,957,273 | A | * | 9/1999 | Karasik .............. H01H 11/0006 200/339 |
| 6,388,221 | B1 | * | 5/2002 | Rudolph ................ H01H 23/04 200/339 |

(Continued)

FOREIGN PATENT DOCUMENTS

| | | |
|---|---|---|
| CN | 103198961 A | 7/2013 |
| CN | 203179774 U | 9/2013 |

(Continued)

OTHER PUBLICATIONS

WO 2012/115284, Yamanaka et al., Feb. 2012.*

*Primary Examiner* — Kyung Lee
(74) *Attorney, Agent, or Firm* — Frank MacKenzie; Brooks Kushman P.C.

(57) ABSTRACT

A switch assembly includes a switch unit including a button and an arm extending from the button along a height direction, the arm including first and second contact portions spaced apart from each other along a longitudinal direction; and a slider unit extending along a width direction and including a nose to contact the first and second contact portions respectively at first and second engagement positions. The switch assembly provides a reduced need for space and enhanced friendliness in touch and feel.

14 Claims, 5 Drawing Sheets

(56) References Cited

U.S. PATENT DOCUMENTS

| | | | |
|---|---|---|---|
| 6,590,175 B1 | 7/2003 | Lam | |
| 6,646,211 B2 * | 11/2003 | Taniuchi | H01H 23/14 200/18 |
| 6,756,556 B2 * | 6/2004 | Kubota | H01H 23/168 200/517 |
| 6,857,357 B2 * | 2/2005 | Fujii | H01H 3/60 100/339 |
| 7,009,127 B2 * | 3/2006 | Hoelzle | H01H 23/025 200/315 |
| 7,528,335 B2 * | 5/2009 | Lanser | H01H 15/102 200/252 |
| 2005/0133357 A1 * | 6/2005 | Shimoda | B60Q 3/82 200/550 |
| 2013/0098747 A1 * | 4/2013 | Chiba | H01H 23/145 200/547 |
| 2014/0042007 A1 * | 2/2014 | Sakai | H01H 1/44 200/556 |

FOREIGN PATENT DOCUMENTS

| | | |
|---|---|---|
| CN | 204303642 | 4/2015 |
| DE | 4415665 A1 | 11/1995 |
| DE | 102008051228 A1 | 4/2010 |
| GB | 2285885 A | 7/1995 |
| WO | 2012002581 A1 | 1/2012 |
| WO | 2012157787 A1 | 11/2012 |
| WO | 2015012300 A1 | 1/2015 |

\* cited by examiner

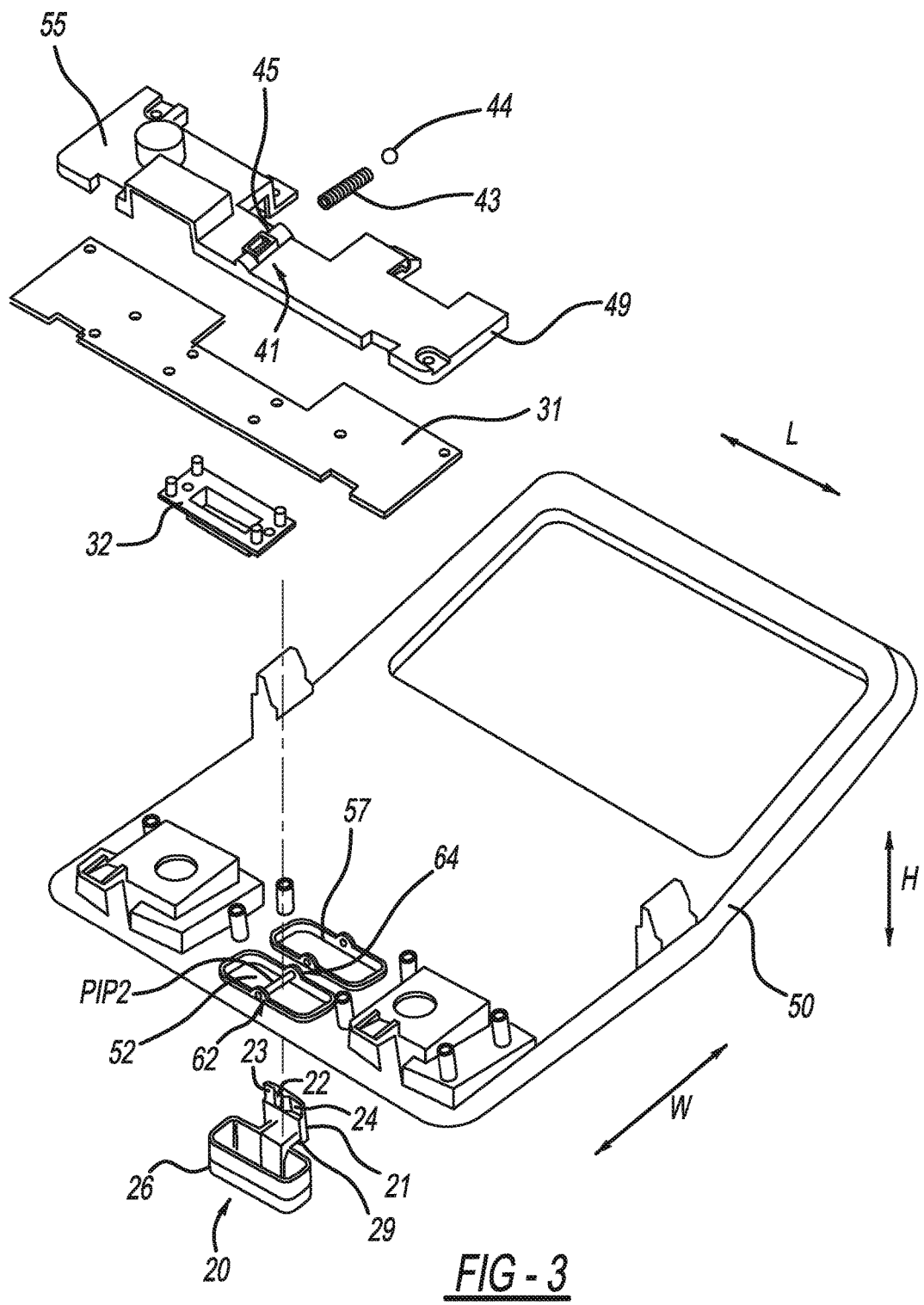

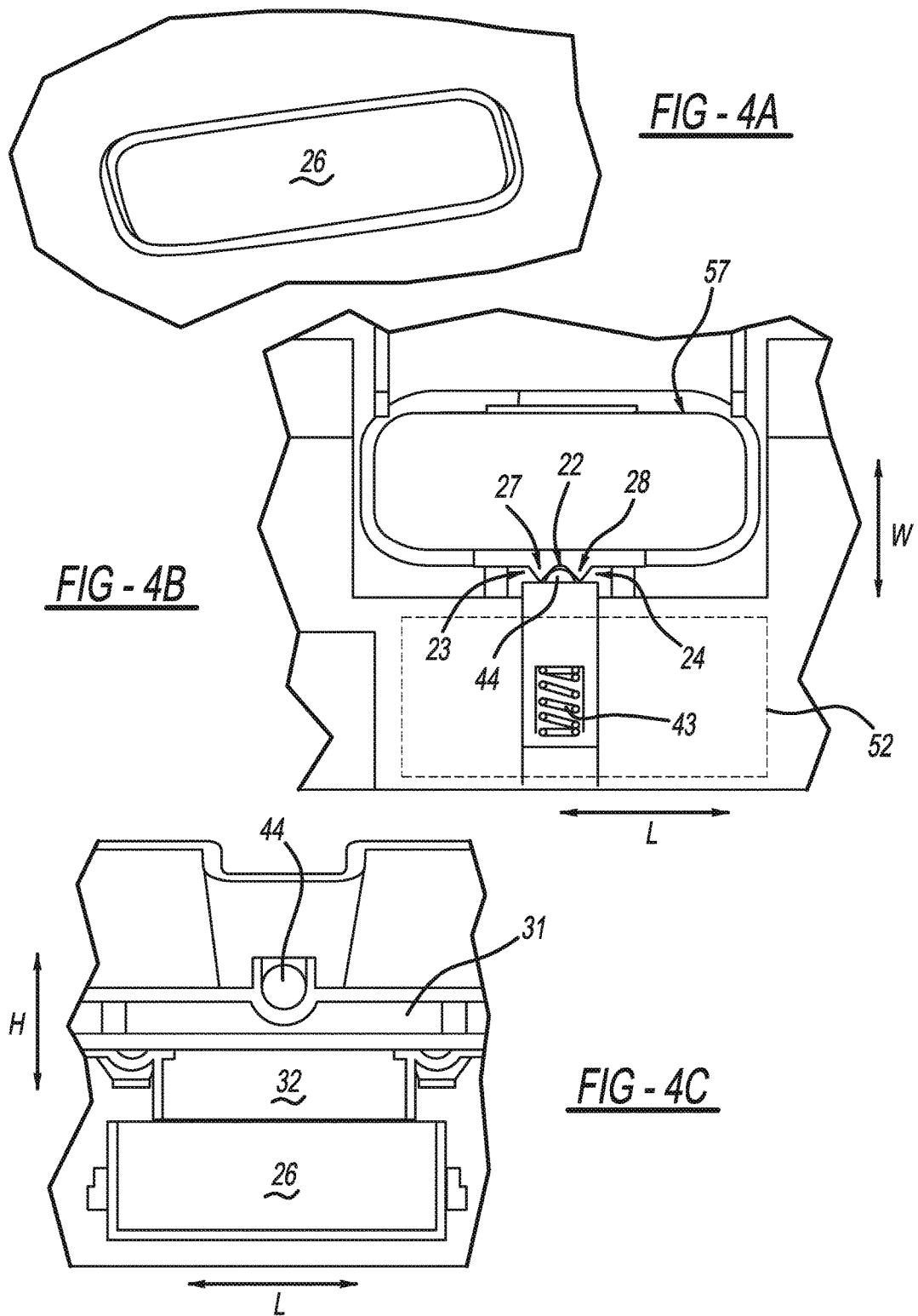

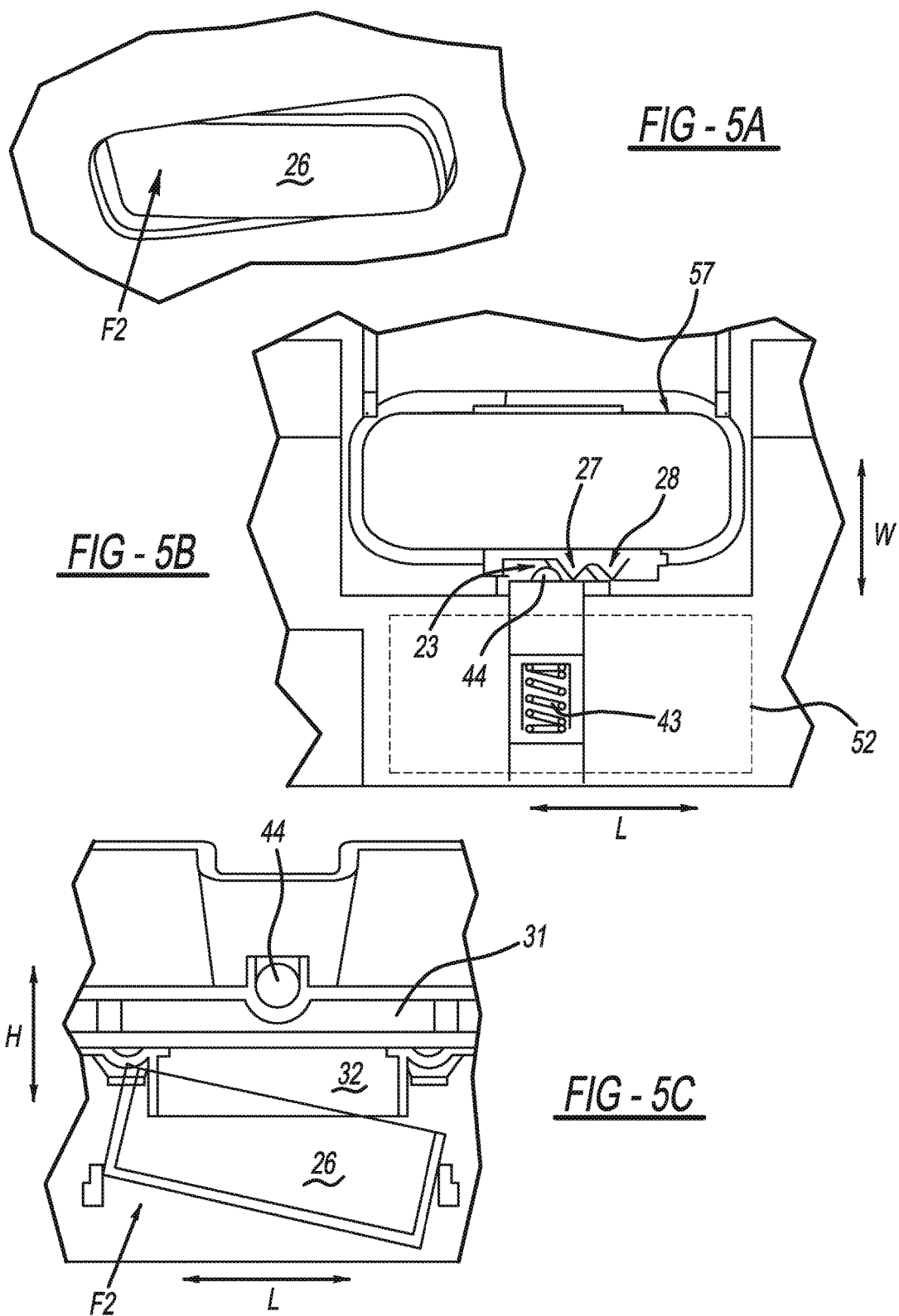

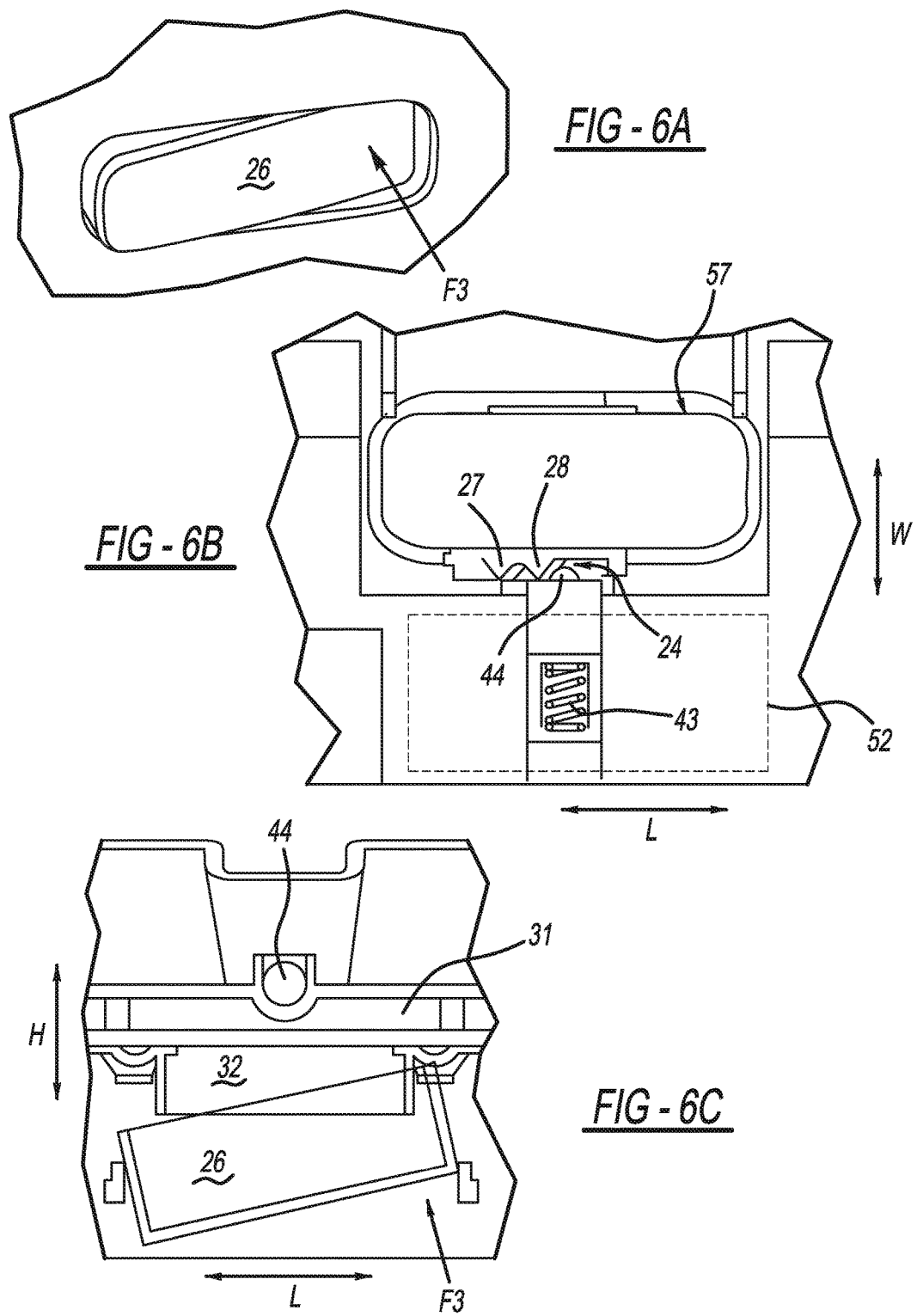

SWITCH ASSEMBLY

CROSS-REFERENCE TO RELATED APPLICATIONS

This application claims foreign priority benefits under 35 U.S.C. § 119(a)-(d) to CN 2015 10 751 953.6 filed Nov. 6, 2015, which is hereby incorporated by reference in its entirety.

TECHNICAL FIELD

The present disclosure relates to a switch assembly.

BACKGROUND

Switches are widely used in the field of electronics and vehicles. Switches are often positioned at locations with limited space such as electronics front panels and vehicle overhead panels, while it is desirable for the switch to be provided with a number of operational positions, and be provided with good touch and feel, and good electrical connections.

According to certain existing technologies, sliding devices may be used to effectuate positional and hence functional changes of the switch. For instance, U.S. Pat. No. 6,646,211 B2 discloses a switch that includes a rocker-button unit and a slider connected thereto, where the slider may slide inside of a switch housing responsive to changes in switch position.

SUMMARY

In one or more embodiments, a switch assembly includes: a switch unit including a button and an arm extending from the button along a height direction, the arm including first and second contact portions spaced apart from each other along a longitudinal direction; and a slider unit extending along a width direction and including a nose to contact the first and second contact portions respectively at first and second engagement positions. The nose may include a polymeric material.

The slider unit may further include a spring positioned between the arm and the nose along the width direction.

The switch assembly may further include a control circuit to be positioned between the slider unit and the button along the height direction or that the slider unit is positioned between the control circuit and the button.

The switch assembly may further include a cushion to be positioned between the button and the control circuit.

The switch assembly may further include a control circuit cover to support the slider unit such that the control circuit is positioned between the button and the control circuit cover.

The button may pivot about an axis extending along the width direction.

The arm may further include a third contact portion spaced apart from the first and second contact portions along the longitudinal direction.

The switch unit may further include a waist to be positioned between the arm and the button along the width direction.

The switch unit may further include a switch case with an aperture to receive there through at least a portion of the switch unit.

According to another one or more embodiments, a switch assembly includes: a switch unit including a button and an arm extending from the button along a height direction, the arm including first and second contact portions spaced apart from each other along a longitudinal direction, the switch unit further including a waist to be positioned between the arm and the button along the width direction; a slider unit extending along a width direction and including a nose to contact the first and second contact portions respectively at first and second engagement positions; and a switch base with an aperture to receive there through at least a portion of the switch unit.

The button my pivot about the switch base.

The arm may further include a third contact portion spaced apart from the first and second contact portions along the longitudinal direction.

BRIEF DESCRIPTION OF THE DRAWINGS

FIG. 3 illustratively depicts a partial exploded view of the switch assembly referenced in FIG. 1;

FIGS. 4A through 4C illustratively depict, respectively, an external head-up view, a top-down view, and a side view of the switch assembly referenced in FIG. 1, at a first position;

FIGS. 5A through 5C illustratively depict, respectively, an external head-up view, a top-down view, and a side view of the switch assembly referenced in FIG. 1, at a second position; and FIGS. 6A through 6C illustratively depict, respectively, an external head-up view, a top-down view, and a side view of the switch assembly referenced in FIG. 1, at a third position;

DETAILED DESCRIPTION

Figure 1:
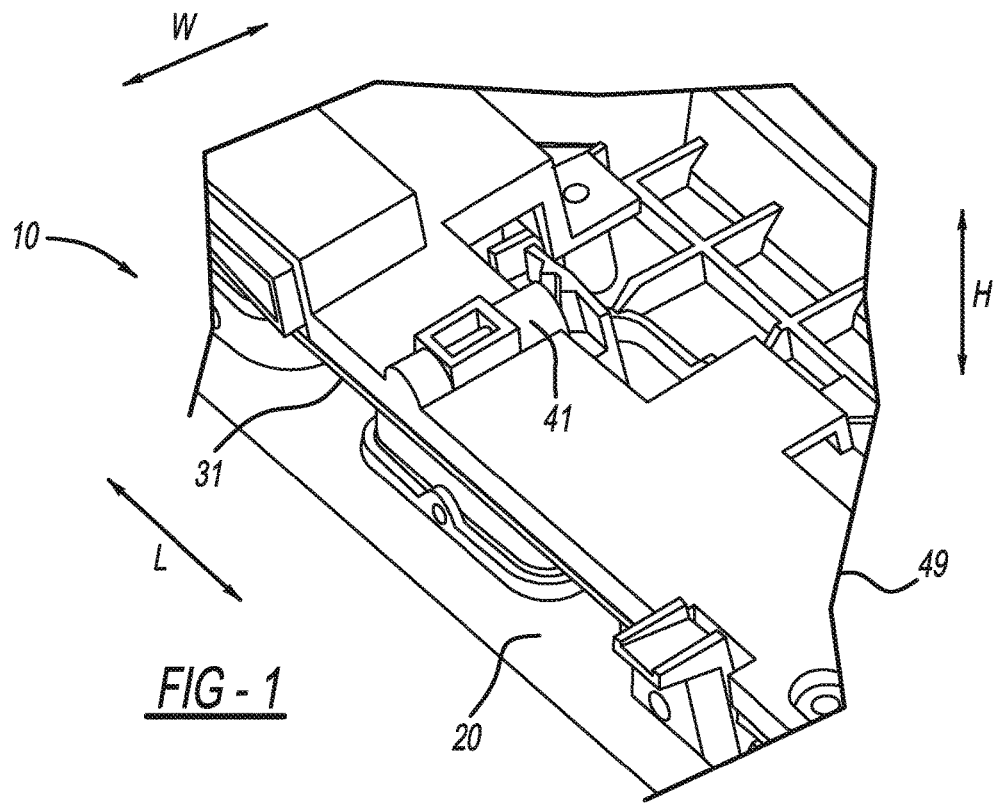
FIG. 1 illustratively depicts a perspective view of a switch assembly according to one or more embodiments of the present disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As referenced in the Figures, the same reference numerals may be used to refer to the same components. As detailed herein, different parameters and components may be used to refer to embodiments of different structures. These specific parameters and components are included as examples and are not meant to be limiting.

According to one or more embodiments, the present disclosure is advantageous at least in providing a switch assembly with reduced need for space and enhanced friendliness in touch and feel. In particular, via the acknowledgement that structures sliding along a vertical or thickness direction require relatively more operational space, the present disclosure in one or more embodiments works to reduce the need of operational space along the vertical or thickness direction, so as to avoid difficulties associated with limited space along the thickness direction.

Figure 2:
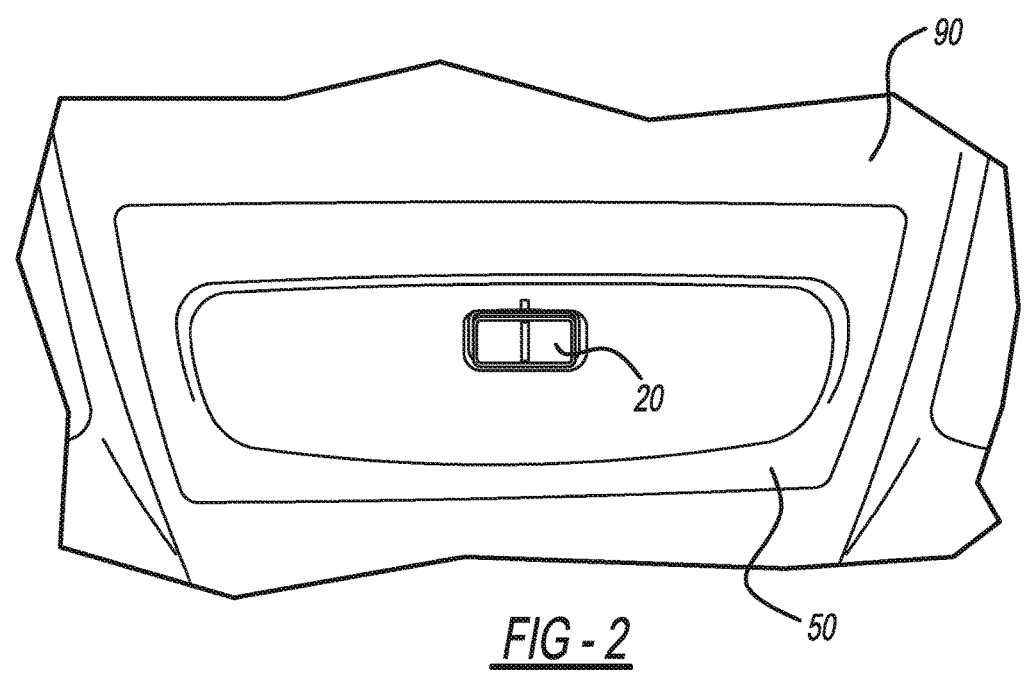
FIG. 2 illustratively depicts an external head-up view of the switch assembly referenced in FIG. 1.

In one or more embodiments, and in view of FIG. 1, FIG. 2 and FIG. 3, respectively, an assembled view and an exploded view of a switch assembly 10 of FIG. 1 is shown.

The switch assembly 10 includes a switch unit 20 and a slider unit 41, where the switch unit 20 includes a button 26 and an arm 21 extending from the button 26 along a height direction H. The arm 21 includes first and second contact portions 22, 23 spaced apart from each other along a longitudinal direction L. The slider unit 41 extends along a width direction W and includes a nose 44 to contact the first and second contact portions 22, 23 respectively at first and second engagement positions.

The length direction L is in a transverse relationship to the width direction W with an angle formed there-between of greater than zero and smaller than 180 degrees, of greater than 45 and smaller than 135 degrees, or of greater than 75 and smaller than 115 degrees. The height direction H may be viewed as coming out of the plane defined by the length direction L and the width direction W. In certain embodiments in relation to a vehicle interior, the plane defined by the length direction L and the width direction W may include or be part of a vehicle overhead compartment 90. Accordingly, the height direction H is in alignment with the thickness of the vehicle overhead compartment 90.

Referring back to FIG. 3, the arm 21 may further include a third contact portion 24 spaced apart from the first and second contact portions 22, 23. In the configuration illustratively depicted in FIG. 3, the first contact portion 22 is positioned between and spaced apart from the second and third contact portions 23, 24. Dependent upon the type of configuration at hand, more or fewer than three spaced apart contact portions may be employed.

Separation of the contact portions may be realized via the formation of one or more protrusions formed upon the arm 21. With reference to FIG. 3 and further in view of FIG. 4B, FIG. 5B and FIG. 6B, three separate contact portions 22, 23 and 24 are formed upon the arm 21 via protrusions 27, 28. The contact portions 22, 23 and 24 may also be formed upon the arm 21 via any other suitable methods such as via formation of cavities.

To provide additional design freedom, for instance to facilitate that the arm 21 may extend along the height direction H at suitable positions, a waist 29 may be provided to be positioned between the arm 21 and the button 26 along the width direction H. The waist 29 may be of any suitable width along the width direction W, with non-limiting example value ranges thereof including 0.5 to 15 centimeters, 1.0 to 10 centimeters, or 1.5 to 7.5 centimeters. In certain embodiments, and further in view of FIG. 3, the waist 29 may be positioned between the button 26 and any one of the contact portions 22, 23, 24 along the height direction H.

The arm 21 does not have to be perpendicular to the button 26 or the waist 29, and may be extending along the height direction H with an angle relative to the button 26 or the waist 29 to meet space limitation associated with a particular assembly.

With further reference to FIG. 3, and as mentioned herein elsewhere, the switch assembly 10 further includes the slider unit 41, where the slider unit 41 includes the nose 44 which may slide back and forth along the width direction "W" and contact the contact portions 22, 23 and 24 of the arm 21 so as to effectuate switch positioning. The nose 44 may be of a protruding outer contour such as a sphere or hemisphere, which facilitates the sliding movement of the nose 44 to contact various contact portions or cavities positioned there-between.

The nose of the slider unit 41 may be of any suitable shape to facilitate its engagement with any of the first, second and third contact portions 22, 23, 24. In certain embodiments, the nose 44 may include or be formed of a polymeric material and in particular elastic or resilient polymeric materials so as to better engage the arm 21 for positional control. Non-limiting examples of the polymeric material include any suitable thermoplastic and thermoset polymeric materials.

In certain embodiments, and to facilitate movement of the nose 43 along the width direction W, the slider unit 41 may further include an elastic part 43, such as a spring to support and provide elasticity to the nose 44. Via the employment of the elastic part 43, a relatively reduced force may be externally applied to effectuate movement of the nose 44 among the various contact positions, such that the slider unit 41 may contact with enhanced ease the various contact portions 22, 23, 24 of the arm 21. In addition, when the slider unit 41 is at a given contact position, the elastic part 43 works to maintain the nose 44 of the slider unit 41 to be at the given contact position and not to move beyond the protrusion 27 or protrusion 28 without an external force applied. The elastic part 43 is particularly useful when the nose 44 is not elastic, such as when the nose 44 includes or is formed of a metallic material such as steel.

The nose 44 may be connected to the elastic part 43 to avoid unwanted dislocation of the nose 44 away from the slider unit 41, particularly during position change in relation to any of the first, second and third contact portions 22, 23, 24. Moreover, and further in view of FIG. 3, the slider unit 41 may further include a slider housing 45 to receive there-within at least partially the elastic part 43 and optionally along with the nose 44.

Referring again to FIG. 3, and in certain embodiments, the switch assembly 10 may further include a switch housing 50. The switch housing 50 may be of any suitable shapes dependent upon the circumstances. For instance, when positioned on the overhead panel of the vehicle, the switch case 50 may be of any suitable configuration to match the overhead panel. The switch housing 50 may include an aperture 52 to receive, there through, at least a portion of the switch assembly 20. The switch assembly 20 may be in pivoting connection with the switch case 50 such that for instance the button 26 pivots about the switch case 50 and in particular about an axis P1, P2 defined between connectors 62, 64 and extending along the width direction W.

Referring back to FIG. 3, and further in view of FIGS. 4B, 5B and 6B, a second aperture 57 may be provided to the switch case 50 and be positioned for instance next to and spaced apart from the first aperture 52. A second switch unit (not shown) similar or same to the switch unit 20 may be provided to be at least partially received through the second aperture 57 and to function similarly as the switch unit 20. This side-by-side switch and aperture configuration may be particularly useful when additional switch control is desirable.

The switch assembly 10 may further include a control circuit 31 to be positioned within the housing. The control circuit 31 may be of any suitable electrical circuit types, such as printed circuit board (PCB) or circuits formed with basic circuit elements and integrated chips. The control circuit 31 may be in electrical communication with the object to be controlled, so as to impart switch control to the object. The control circuit may be in electrical communication with the overhead lights of the vehicle, so as to impart switch control to the left light or the right light. Similarly, the control circuit 31 may also be employed to impart control to the front and rear headlights of the vehicle and the cabin temperature of the vehicle. The control circuit 31 is operable via the button, such that when the button is pushed down to different positions, relevant portion of the control circuit may be rendered open or close so as to impart ON or Off to the object.

To protect the control circuit 31, a control circuit cover 55 may be employed to be positioned above or below the control circuit 31 along the height direction H. The control circuit cover 55 may be provided with edge 49 to at least partially cover the control circuit 31 such that the control circuit 31 may be protected as being positioned between the control circuit cover 55 and the switch case 50. In certain embodiments, and as illustratively depicted in FIG. 3, the slider unit 41 and in particular the slider housing 45 thereof may be positioned on the control circuit cover 55, for instance, to be integral or connected thereto. The control circuit cover 55 may be relatively secured onto the switch case 50 or any suitable locations thereof.

The control circuit cover 55 may be integral to or be separate from the control circuit, and may be formed of any hard insulating materials such as plastics and wood.

With further reference to FIG. 3, and in certain embodiments, the switch assembly 10 may further include a cushion 32 to be at least partially positioned between the button 26 and the control circuit 31. The cushion 32 may include or be formed of an elastic material to improve on the handling friendliness thereof. The cushion 32 may further include an electrically conducting material to connect a switch part of the control circuit, such that corresponding portions of the control circuit may be in electrical communication via the deformation of the cushion 32 upon a press of the button 26. It is appreciated for those in the technical field that certain switch parts of the control circuit may be positioned at the cushion such that the cushion and button may accordingly function as the control switch thereof. In certain particular embodiments, the cushion is a rubber layer with a portion thereof including an electrical conducting material. For instance, the cushion 32 includes a first portion including an elastic material and to contact the button 26, and the cushion 32 includes a second portion including an electricity-conducting material to contact the control circuit 31, where the electricity-conducting material may include a contact part including carbon or metal and may be of a layer or a column in shape.

Accordingly, the slider unit 41 or any parts of thereof including the nose 44 and the elastic portion 43 may be positioned at any suitable locations of the switch assembly 10, such as being positioned on and/or integral to the switch case 50, the cushion 32, the control circuit 31 and/or the control circuit cover 55. In certain embodiments, and as illustratively depicted in FIG. 3, the slider unit 41 may be formed integral to the control circuit cover 55 and includes the nose 44 along with the elastic portion 43.

The button 26 may be any one of rocker buttons, paddle buttons, knob buttons or other types of buttons.

FIGS. 4A through 4C illustratively depict operational mechanism of the switch assembly 10 referenced in FIG. 1 according to one or more embodiments, when being at the first operational position, where the switch assembly 10 is at the first or middle contact portion 22. As depicted in FIG. 4B and FIG. 4C, the first contact portion 22 of the arm 21 is in contact with the nose 44 of the slider unit 41, where the button 26 is at the first position or an Off position. If employed, the cushion 32 is without deformation and hence without connection to the control circuit 31, and therefore the control circuit is at an Off position.

FIGS. 5A through 5C illustratively depict operational mechanism of the switch assembly referenced in FIG. 1 according to one or more embodiments, when being at the second operational position, where a left side of the button 26 is pressed down along for instance direction F2, such that the button 26 of the switch assembly 10 is tilted toward the right, so as to be at the second position or the first ON position. As depicted in FIG. 5B and FIG. 5C, due to the press-down of the left side of the button 26, the arm 21 along with the button 26 is together tilted toward the right, such that the contact position of the nose 44 of the slider unit 41 relative to the arm 21 changes from the first contact position with contact to the first contact portion 22 to the second or left position with contact to the second contact portion 23. With the elastic force of the elastic part 43 imparted onto the nose 44 of the slider unit, the nose 44 is pressed against the left contact portion 22 of the arm so as to keep the button 26 to tilt toward the right, when the external force on the button 26 is removed or withdrawn. With the up and down movement of the left side of the button 26, the left side of the cushion is accordingly compressed so as to be in contact with the control circuit 31. Because the cushion includes the electrically conducting material, and upon compression, an electrical communication is established at the corresponding left side of the control circuit.

Similarly, FIGS. 6A through 6C illustratively depict operational mechanism of the switch assembly referenced in FIG. 1 according to one or more embodiments, when being at the third operational position, where a right side of the button 26 is pressed down along for instance direction F3, such that the button 26 of the switch assembly 10 is tilted toward the left, so as to be at the third operational position or the right position. As depicted in FIG. 6B and FIG. 6C, due to the press-down of the right side of the button 26, the arm 21 along with the button 26 is together tilted toward the left, such that the contact position of the nose 44 of the slider unit 41 relative to the arm 21 changes from the first contact position with contact to the first contact portion 22 to the third or right position with contact to the third contact portion 24. With the elastic force of the elastic part 43 imparted onto the nose 44 of the slider unit, the nose 44 is pressed against the right contact portion 24 of the arm so as to keep the button 26 to tilt toward the left, when the external force on the button 26 is removed or withdrawn. With the up and down movement of the right side of the button 26, the right side of the cushion is accordingly compressed so as to be in contact with the control circuit 31. Because the cushion includes the electrically conducting material, and upon compression, an electrical communication is established at the corresponding left side of the control circuit.

As mentioned herein elsewhere, a pivoting movement of the button 26 is translated to a positional change of the nose 44 relative to the arm 21 along the length direction L, and accordingly the button 44 and hence the switch assembly 10, in general, may be maintained at a given position via an engagement of the nose 44 to one of the first, second and third contact portions 22, 23, 24 of the arm 21. Therefore, although permissible, movement of the slider unit 41 and in particular the nose 44 thereof along any other directions such as the height direction H or the width direction W is not necessary. In this regard, this configuration is particularly useful when space availability is limited along the height direction H or the width direction W.

The arm 21 may be formed via any suitable methods, including but not limited to being formed integrally, or via adhesives, via welding and rivet connections. Via an adjustment of the button 26, the arm 21 may be positioned at various operational positions, and accordingly the control circuit may exert controls of a number of operational functions. The arm 21 may be formed integral to the button 26, and with the elastic support from the elastic part 43, a relatively small amount of force may accordingly be needed to effectuate a good switch control with relatively reduced energy loss at the switch. The positional change of the slider unit 41 is designed to take place along the length direction "L", and in particular along the plane defined by the longitudinal direction "L" and the width direction "W". Accordingly, unnecessary limitation imposed along the height direction "H" or the width direction "W" may be reduced, and in particular switch assembly limitation on the height direction "H" may be effectively reduced, such that the switch assembly may be employed at locations where height limitations are present. Thus, the present disclosure is believed to have solved technical issues in torque requirement and space consumption associated with switch assembly.

However, one skilled in the art will readily recognize from such discussion, and from the accompanying drawings and claims that various changes, modifications and variations can be made therein without departing from the true spirit and fair scope of the disclosure as defined by the following claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A switch assembly, comprising:
    a switch including a button and an arm extending from the button along a height direction, the arm including first and second contact portions spaced along a longitudinal direction; and
    a slider unit extending along a width direction, including a polymeric nose, positioned between the arm and a spring along the width direction to contact the first and second contact portions, respectively, at first and second engagement positions.

2. The switch assembly of claim 1 further comprising a control circuit positioned between the slider and button such that the slider unit is between the control circuit and the button, wherein a cushion interposes the button and the control circuit.

3. The switch assembly of claim 1 further comprising a cover to support the slider unit such that the control circuit is positioned between the button and the cover.

4. The switch assembly of claim 1, wherein the button pivots about an axis extending along the width direction.

5. The switch assembly of claim 1, wherein the arm further includes a third contact portion spaced apart from the first and second contact portions along the longitudinal direction.

6. The switch assembly of claim 1, wherein the switch further includes a waist to be positioned between the arm and the button along the width direction.

7. The switch assembly of claim 1, further comprising a switch case with an aperture to receive there through at least a portion of the switch.

8. A vehicle overhead compartment comprising:
    a switch unit including a button and an arm extending from the button along a height direction, the arm including first and second contact portions spaced apart from each other along a longitudinal direction, the switch unit further including a waist to be positioned between the arm and the button along a width direction;
    a slider unit extending along a width direction and including a nose being a polymeric material and positioned between the arm and spring along the width direction to contact the first and second contact portions respectively at first and second engagement positions;
    a control circuit positioned between the slider unit and button such that the slider unit is between the control circuit and the button, wherein a cushion interposes the button and the control circuit; and
    a switch base with an aperture to receive there through at least a portion of the switch unit.

9. The vehicle overhead compartment of claim 8, wherein the button pivots about the switch base.

10. The vehicle overhead compartment of claim 8, wherein the arm further includes a third contact portion spaced apart from the first and second contact portions along the longitudinal direction.

11. A vehicle comprising:
    an overhead compartment defined within a vehicle interior;
    a switch assembly attached to the overhead compartment and including a switch unit including a button and an arm extending from the button along a height direction, the arm including first and second contact portions spaced apart from each other along a length direction, and a slider unit extending along a width direction and including a nose being a polymeric material and positioned between the arm and a spring along the width direction to contact the first and second contact portions, respectively, at first and second engagement positions; and
    a control circuit positioned between the slider unit and button such that the slider unit is between the control circuit and the button, wherein a cushion interposes the button and the control circuit.

12. The vehicle of claim 11, wherein the height direction is aligned with a thickness of the overhead compartment.

13. The vehicle of claim 11, wherein the length direction is in a transverse relationship to the width direction having an angle formed between the length and width directions.

14. The vehicle of claim 11, wherein the length direction and the width direction define a plane on at least part of the overhead compartment.

* * * * *